United States Patent

Hayashida et al.

[11] Patent Number: 6,033,775
[45] Date of Patent: Mar. 7, 2000

[54] MULTI-LAYER STRETCH WRAPPING FILM

[75] Inventors: Haruo Hayashida, Chiba; Eisuke Shiratani; Ikuo Yamamoto, both of Ichihara; Akihiro Ichige, Sodegaura, all of Japan

[73] Assignee: Sumitomo Chemical Company, Limited, Osaka, Japan

[21] Appl. No.: 08/980,456

[22] Filed: Nov. 28, 1997

[30] Foreign Application Priority Data

Nov. 29, 1996 [JP] Japan ................................. 8-320474

[51] Int. Cl.⁷ ........................... B32B 27/08; B32B 7/12
[52] U.S. Cl. .......................... 428/349; 428/516; 428/520; 428/910
[58] Field of Search ..................... 428/515, 516, 428/520, 910, 349, 354; 525/240

[56] References Cited

U.S. PATENT DOCUMENTS

| | | | |
|---|---|---|---|
| 3,262,992 | 7/1966 | Holzer et al. | 260/876 |
| 3,354,239 | 11/1967 | Short | 260/876 |
| 4,087,505 | 5/1978 | Sugimoto et al. | 264/95 |
| 4,147,827 | 4/1979 | Breidt, Jr. et al. | 428/210 |
| 4,211,852 | 7/1980 | Matsuda et al. | 525/240 |
| 4,333,968 | 6/1982 | Nahmias | 427/173 |
| 4,337,326 | 6/1982 | Shiga et al. | 525/244 |
| 4,461,872 | 7/1984 | Su | 525/240 |
| 4,650,829 | 3/1987 | Bossaert et al. | 525/99 |
| 4,921,749 | 5/1990 | Bossaert et al. | 428/216 |
| 4,927,885 | 5/1990 | Hayashida et al. | 525/211 |
| 5,026,778 | 6/1991 | Fujii et al. | 525/210 |
| 5,206,075 | 4/1993 | Hogson, Jr. | 428/216 |
| 5,212,009 | 5/1993 | Peiffer et al. | 428/220 |
| 5,516,848 | 5/1996 | Canich et al. | 525/240 |
| 5,641,569 | 6/1997 | Hayashida et al. | 428/345 |
| 5,654,372 | 8/1997 | Sadatoshi et al. | 525/323 |
| 5,670,580 | 9/1997 | Tazaki et al. | 525/240 |
| 5,736,260 | 4/1998 | Hayashida et al. | 428/516 |
| 5,830,968 | 11/1998 | Sadatoshi et al. | 526/348.1 |
| 5,851,640 | 12/1998 | Schuhmann et al. | 428/200 |

FOREIGN PATENT DOCUMENTS

| | | |
|---|---|---|
| B212187 | 3/1990 | Japan . |
| B218983 | 4/1990 | Japan . |
| 5147174 | 6/1993 | Japan . |
| 6927 | 1/1994 | Japan . |

*Primary Examiner*—Paul Thibodeau
*Assistant Examiner*—Kevin R Kruer
*Attorney, Agent, or Firm*—Stevens, Davis, Miller & Mosher, L.L.P.

[57] ABSTRACT

A film containing a first layer containing a propylene-based block copolymer (a) obtainable by forming 40 to 85% by weight of a propylene-ethylene copolymer portion (A) having a content of repeating unit derived from ethylene of 1.5 to 6.0% by weight in a first step, and then forming 15 to 60% by weight of a propylene-ethylene copolymer portion (B) having a content of repeating unit derived from ethylene of 7 to 17% by weight in a second step, the intrinsic viscosity of portion (B) being 2 to 5 dl/g, and the ratio of the intrinsic viscosity of portion (B) to the intrinsic viscosity of portion (A) being 0.5 to 1.8, and a second layer containing a polyethylene type resin (b) laminated on at least one surface of the first layer, has a good balance between heat resistance, flexibility, mechanical strength, transparency, cuttability, original-shape resuming property and other desirable properties, and is suitably used for wrapping materials such as foods.

9 Claims, 1 Drawing Sheet

MULTI-LAYER STRETCH WRAPPING FILM

BACKGROUND OF THE INVENTION

1. Field of the Invention

The present invention relates to a stretch wrapping film. More particularly, it relates to a stretch wrapping film having excellent heat resistance, flexibility, mechanical strength, transparency, cuttability and original-shape resuming properties, which is used for stretch-packaging food alone or together with a plastic tray loaded therewith or the like.

2. Description of the Related Art

As stretch wrapping films for stretch-packaging food (e.g. fruits, vegetables, fresh fishes, fresh meat, daily dishes, etc.) alone or together with a plastic tray loaded therewith or the like, vinyl chloride resin films have been mainly used. Recently, to solve the problems concerning safety and sanitation (e.g., preventing the generation of carcinogenic substances by incineration), films of polyethylene type resins such as low-density polyethylenes, ethylene-vinyl acetate copolymers, etc. have been energetically developed in place of conventional vinyl chloride resin films.

However, when a low-density polyethylene or the like is used alone, it has been impossible to attain, for example, a good balance between the uniformity of film in elongation, film rigidity, and other desirable properties. The ethylene-vinyl acetate copolymer films are free from the above-mentioned problem in the low-density polyethylene films when the content of repeating units derived from vinyl acetate, the molecular weight, etc. are properly chosen. They, however, have been disadvantageous in being torn off to be broken in the case of packaging a tray having sharp corners or a food having a sharp-edged portion.

Therefore, for example, JP-B-2-12187 and JP-B-2-18983 have proposed stretch wrapping films obtained by laminating an ethylene-vinyl acetate copolymer on an ethylene-α-olefin copolymer in order to satisfy all the required performance characteristics at a time. Although these films are excellent in mechanical strength, they are poor in flexibility and original-shape resuming properties. Moreover, they are disadvantageous in that they are perforated when heat-sealed at the bottom of a tray due to their low heat resistance.

Accordingly, for example, JP-A-5-147174 has proposed a film obtained by laminating an ethylene resin on a layer of a mixture of a crystalline olefin resin and an olefin elastomer. JP-A-6-927 has proposed a film obtained by laminating an ethylene resin on a layer of a resin composition containing an amorphous polyolefin and a crystalline polypropylene.

Although these films are excellent in original-shape resuming properties, they have too high a resilience. Therefore, when a plastic tray loaded with food is packaged in the film with an automatic packaging machine, the film is turned in due to the resilience, so that the packaging machine is stopped.

BRIEF SUMMARY OF THE INVENTION

An object of the present invention is to provide a stretch wrapping film having excellent heat resistance, flexibility, mechanical strength, transparency, cuttability and original-shape resuming properties, in particular, a stretch wrapping film for food, etc.

The present inventors earnestly investigated a stretch wrapping film having excellent heat resistance, flexibility, mechanical strength, transparency, cuttability and original-shape resuming properties in addition to conventionally imparted performance characteristics, and consequently found that a stretch wrapping film obtained by laminating a polyethylene type resin layer on at least one side of a layer containing a specific propylene-based block copolymer as a constituent achieves the object of the present invention. Thus, the present invention has been accomplished.

That is, the present invention provides a stretch wrapping film comprising:

a first layer comprising a propylene-based block copolymer (a) obtainable by a polymerization process comprising a first step of forming 40 to 85% by weight of portion (A) which is a propylene-ethylene copolymer having a content of repeating unit derived from ethylene (hereinafter referred to as "ethylene unit") of 1.5 to 6% by weight, and then a second step of forming 15 to 60% by weight of portion (B) which is a propylene-ethylene copolymer having a content of repeating unit derived from ethylene of 7 to 17% by weight, the intrinsic viscosity of portion (B) ([η]B) being 2 to 5 dl/g, and the ratio ([η]B/[η]A) of the intrinsic viscosity of portion (B) ([η]B) to the intrinsic viscosity of portion (A) ([η]A) being 0.5 to 1.8, and a second layer comprising a polyethylene type resin (b) laminated on at least one surface of the first layer.

DETAILED DESCRIPTION OF THE DRAWINGS

Figure 1:
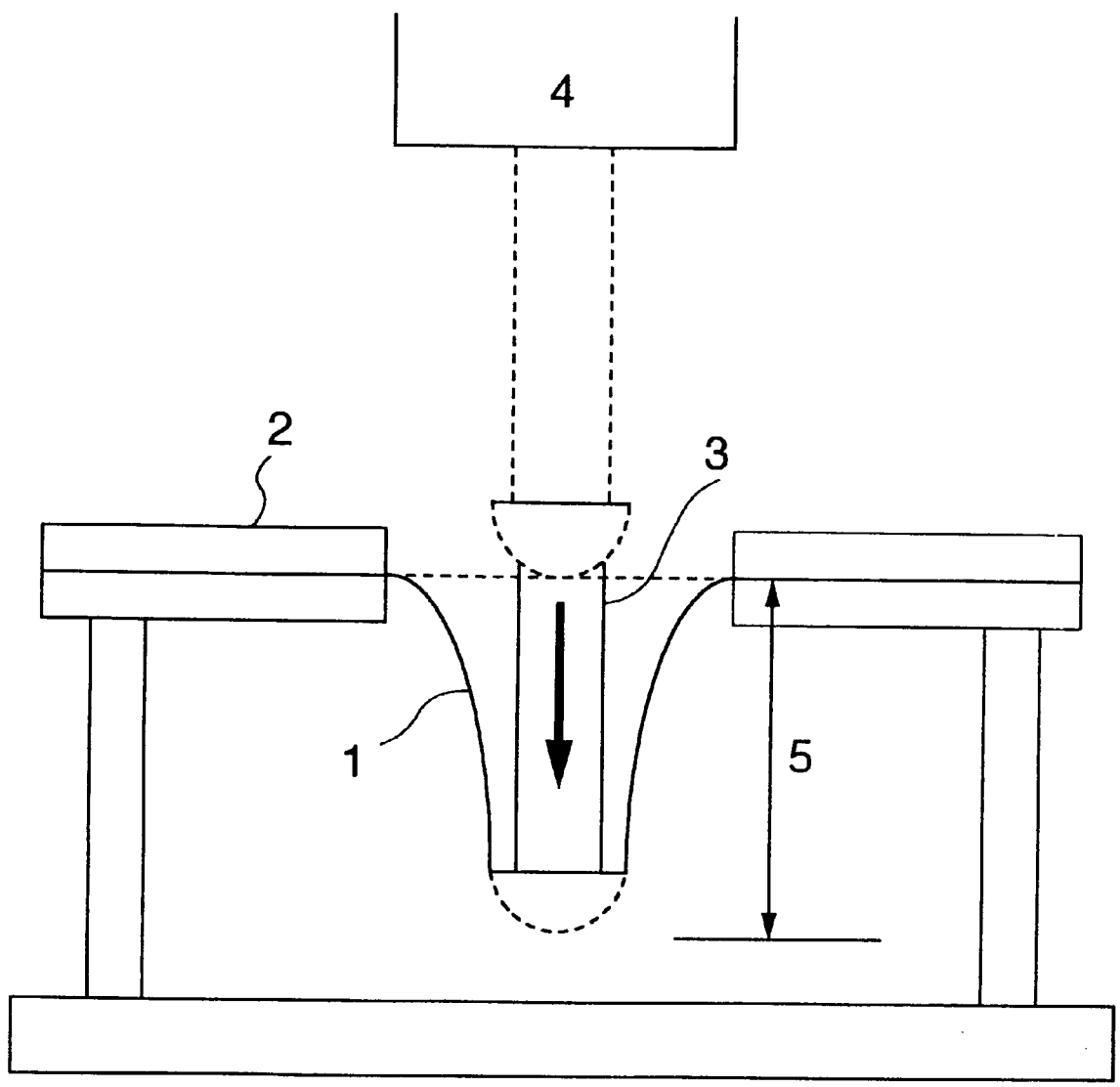

FIG. 1 is a plan view of an apparatus for measuring the degree of original-shape resumption; 1: round sample film, 2: film-fixing instrument, 3: pin, 4: load cell, 5: depth of insertion.

DETAILED DESCRIPTION OF THE INVENTION

The propylene-based block copolymer used in the present invention refers to a copolymer which is obtained by producing the propylene-ethylene copolymer portion in the first step and then the propylene-ethylene copolymer portion with an ethylene unit content different from that of the former in the second step, and is not a typical block copolymer obtained by binding the end of a copolymer to the end of another copolymer, but a kind of blended copolymer.

When the ethylene unit content (EA) of the propylene-ethylene copolymer portion (A) produced in the first step is less than 1.5% by weight, the flexibility is undesirably deteriorated. When the ethylene unit content (EA) is more than 6.0% by weight, the heat resistance is undesirably deteriorated. In particular, the ethylene unit content (EA) is preferably 2.5 to 4.5% by weight from the viewpoint of the balance between the flexibility and the heat resistance.

When the ethylene unit content (EB) of the propylene-ethylene copolymer portion (B) produced in the second step is less than 7% by weight, the low-temperature impact resistance is undesirably deteriorated. When the ethylene unit content (EB) is more than 17% by weight, the transparency is undesirably deteriorated. In particular, the ethylene unit content (EB) is preferably 8 to 12% by weight from the viewpoint of the balance between low-temperature impact resistance and transparency.

In the propylene-based block copolymer used in the present invention, the difference (EB - EA) between the ethylene unit content (EB) of portion (B) and the ethylene unit content (EA) of portion (A) ranges preferably from 3 to 15% by weight from the viewpoint of the transparency and low-temperature impact resistance, and (EB–EA) is particularly preferably 5 to 10% by weight from the viewpoint of the balance between the transparency and the low-temperature impact resistance.

The ethylene unit content is measured by $^{13}$C-NMR according to the method described in "Polymer Analysis Handbook", pp. 615–616, Kinokuniya Shoten, 1995.

The ethylene unit content (EA) of portion (A) is determined by sampling the copolymer after completion of the polymerization in the first step.

The ethylene unit content (EB) of portion (B) is determined by sampling the block copolymer after completion of the polymerization in the second step, measuring the ethylene unit content (EAB) of the block copolymer, and calculating EB from the percentage (PA) of portion (A) and the percentage (PB) of portion (B) by the following equation:

$$EB=(EAB-EA \times PA/100) \times 100/PB \quad (EA \times PA/100+EB \times PB/100=EAB)$$

The percentage of the propylene-ethylene copolymer portion (A) produced in the first step is 40 to 85% by weight, preferably 55 to 83% by weight, based on the total weight of portions (A) and (B). The percentages of the propylene-ethylene copolymer portion (B) produced in the second step is 15 to 60% by weight, preferably 17 to 45% by weight, based on the total weight of portions (A) and (B).

When the percentage of portion (B) is less than 15% by weight, the low-temperature impact resistance is not sufficient. When the percentage is more than 60% by weight, the heat resistance is undesirably deteriorated. In particular, the percentage of portion (B) is preferably 17 to 45% by weight.

Although the propylene-based block copolymer particularly containing 17 to 45% by weight of portion (B) can be produced by the polymerization process in accordance with the present invention, it is also possible, for example, to produce a block copolymer containing 27 to 60% by weight of portion (B) by the polymerization process and adjust the percentage of portion (B) by adding a polymer consisting essentially of portion (A) at the time of melt kneading.

From the viewpoint of transparency, the intrinsic viscosity ($[\eta]B$) of portion (B) of the propylene-based block copolymer used in the present invention should be 2 to 5 dl/g, and the ratio ($[\eta]B/[\eta]A$) of the intrinsic viscosity ($[\eta]B$) of portion (B) to the intrinsic viscosity ($[\eta]A$) of portion (A) should be 0.5 to 1.8. When $[\eta]B$ is less than 2 dl/g, the amount of low-molecular weight components is undesirably increased. When $[\eta]B$ is more than 5 dl/g, the fluidity of the propylene-ethylene block copolymer is undesirably deteriorated, resulting in a deteriorated processability. In particular, the intrinsic viscosity ($[\eta]B$) of portion (B) of the propylene-ethylene block copolymer is more preferably 2.5 to 4.0 dk/g from the viewpoint of the balance between the processability and the inhibition of production of low-molecular weight components.

When the ratio $[\eta]B/[\eta]A$ is more than 1.8 or less than 0.5, the compatibility of portion (A) with portion (B) is undesirably deteriorated, resulting in a deteriorated transparency. In particular, the ratio $[\eta]B/[\eta]A$ is preferably 0.8 to 1.5 from the viewpoint of transparency.

The intrinsic viscosity is measured in tetralin at 135° C. with an Ubbelohde viscometer.

The intrinsic viscosity ($[\eta]A$) of portion (A) is determined by sampling the copolymer after completion of the polymerization for producing portion (A) in the first step.

The intrinsic viscosity ($[\eta]B$) of portion (B) is determined by sampling the block copolymer after completion of the polymerization in the second step, measuring the intrinsic viscosity ($[\eta]AB$) of the block copolymer, and calculating $[\eta]B$ from $[\eta]A$, $[\eta]AB$, the percentage (PA) of portion (A) and the percentage (PB) of portion (B) by the following equation:

$$[\eta]B=([\eta]AB-[\eta]A \times PA/100 \times 100/PB$$

$$([\eta]A \times PA/100+[\eta]B \times PB/100=[\eta]AB)$$

A content of 20° C. xylene soluble components with a weight average molecular weight of 26,000 or less, which is contained in the propylene-based block copolymer used in the present invention, is preferably 6% by weight or less for controlling an extraction amount by n-hexane or the like. Particularly when the stretch wrapping film is used as a food-packaging material, the content of the 20° C. xylene soluble components is more preferably 3.5% by weight or less based on the total weight of the block copolymer.

The propylene-based block copolymer used in the present invention can be produced, for example, by a batch polymerization method wherein portion (A) and then portion (B) are produced in one and the same polymerization vessel, or a continuous polymerization method wherein portion (A) and portion (B) are produced in succession by continuous polymerization using a polymerization vessel composed of at least two sub-vessels, in the presence of a catalyst such as, for example, a Ziegler-Natta catalyst.

Specifically, the propylene-based block copolymer can be produced by producing the propylene-ethylene copolymer portion (A) in the first step and then the other propylene-ethylene copolymer portion (B) in the second step at a polymerization temperature of 20–150° C., preferably 50–95° C. and a polymerization pressure of atmospheric pressure to 40 kg/cm²G, preferably 2 to 40 kg/cm²G by feeding propylene, ethylene and hydrogen for molecular weight control in each step. The Ziegler-Natta catalyst is well known and examples thereof are those comprising as essential constituents at least titanium, magnesium and a halogen, such as, for example, a catalyst system comprising (a) a solid catalyst component containing a trivalent titanium compound, which is obtained by reducing a titanium compound of the general formula $Ti(OR^1)_n X_{4-n}$ (wherein $R^1$ is a hydrocarbon group of 1 to 20 carbon atoms, X is a halogen atom and n is a number in a range of $0<n \leq 4$) and/or an ether compound with an organomagnesium compound in the presence of an organosilicon compound having a Si—O bond, to obtain a solid product, and treating the solid product with an ester compound and a mixture of an ether compound and titanium tetrachloride, (b) an organoaluminum compound, and (c) a silicon compound having a Si—OR² bond (wherein R² is a hydrocarbon group of 1 to 20 carbon atoms), wherein the molar ratio of Al atoms in (b) to Ti atoms in (a) may be 1 to 2,000, preferably 5 to 1,500, and that the molar ratio of Si atoms in (c) to Al atoms in (b) may be 0.02 to 500, preferably 0.05 to 50.

The fluidity represented by melt flow rate of the propylene-based block copolymer used in the present invention can be varied, for example, in the presence or absence of an organic peroxide by a well-known method. If necessary, the propylene-based block copolymer can contain antioxidants, ultraviolet absorbers, antistatic agents, antifogging agents, nucleating agents, etc.

In the present invention, the first layer containing the propylene-based block copolymer (a) can further contain other resins as blending resins, so long as the other resins have no undesirable influence on the present invention.

One of preferable examples is a layer comprising a resin composition (d) containing 80 to 20% by weight of the propylene-based block copolymer (a) and 20 to 80% by weight of an amorphous polyolefin (c).

One of more preferable examples is a layer comprising a resin composition (f) containing 60 to 95% by weight of the above resin composition (d) and 40 to 5% by weight of a petroleum resin and/or a hydrogenated product thereof (e).

The amorphous polyolefin (c) referred to in the present specification is one which has a boiling n-heptane insoluble (i.e. the content of an insoluble material which remains after extraction with boiling n-heptane in a Soxhlet's extractor) of 70% by weight or less, preferably 60% by weight or less. When the boiling n-heptane insoluble is more than 70% by weight, the proportion of the amorphous portion would be decreased, so that the resulting film sometimes cannot possess sufficiently desirable flexibility and original-shape resuming properties. In the present invention, the amorphous polyolefin (c) is used singly or in a mixture of two or more.

The amorphous polyolefin (c) used in the present invention includes, for example, amorphous polypropylenes, polybutene-1, propylene-ethylene copolymers, butene-1-ethylene copolymers, propylene-butene-1 copolymers, propylene-butene-1-ethylene terpolymers, propylene-hexene-1-ethylene terpolymers, butene-1-hexene-1-ethylene terpolymers, etc.

Of these, amorphous polyolefins having a content of repeating unit derived from propylene (hereinafter referred to as "propylene unit") and/or repeating unit derived from butene-1 (hereinafter referred to as "butene-1 unit") of 50% by weight or more are preferable.

When the propylene unit content in the amorphous polyolefin is taken as (PA) % by weight, the content of propylene and butene-1 units in the amorphous polyolefin is preferably as follows: when (PA) % is 0 to 65% by weight, the content is (50+0.230×PA) % by weight or more; and when (PA) % is more than 65% by weight, the content is (PA) % by weight or more. The content is more preferably as follows: when (PA) % is 0 to 80% by weight, the content is (50+0.375×PA) % by weight or more; and when (PA) % is more than 80% by weight, the content is (PA) % by weight or more.

As the amorphous polyolefin, there can be used, for example, commercially available Ubetac UT2385 and UT2780 manufactured by Ube Rekisen Co., Ltd.

The petroleum resin or hydrogenated product thereof (e) used in the present invention is a thermoplastic resin obtained by polymerizing a cracked petroleum cut produced by thermal cracking of petroleum, followed by solidification, and includes thermoplastic resins obtained from an aliphatic monomer contained in a $C_5$ cut, those obtained from an aromatic monomer contained in a $C_9$ cut, those obtained by copolymerizing the aliphatic monomer with the aromatic monomer, those obtained from a dicyclopentadiene, and hydrogenated thermoplastic resins obtained by hydrogenating any of these thermoplastic resins. Specifically, there can be used commercial products such as Hilets and Petrozine manufactured by Mitsui Petrochemical Industries, Ltd. and Arkon manufactured by Arakawa Chemical Co., Ltd.

Of the above-exemplified petroleum resins and hydrogenated products thereof, the hydrogenated thermoplastic resins are favorable from the viewpoint of color and odor.

A process for preparing the above-mentioned resin composition (d) used in the present invention is not particularly limited. The resin composition (d) can be prepared by a well-known process, for example, a process comprising heating and melt kneading with a kneading machine (e.g. a kneader, a Banbury mixer or a roll), a single- or twin-screw extruder, or the like. The resin composition (d) may be prepared by dry-blending various resin pellets.

A process for preparing the resin composition (f) used in the present invention is not particularly limited. The resin composition (f) can be prepared by a well-known process, for example, a process comprising heating and melt kneading with a kneading machine (e.g. a kneader, a Banbury mixer or a roll), a single- or twin-screw extruder, or the like. The resin composition (f) can be prepared by dry-blending various resin pellets.

If necessary, the resin composition (d) used in the present invention can contain various additives and fillers, for example, antioxidants, antifogging agents, antistatic agents, nucleating agents and flame retardants. In addition, other resins can be incorporated into the resin composition (d) as blending resins, so long as they have no undesirable influence on the present invention.

If necessary, the resin composition (f) used in the present invention can contain various additives and fillers, for example, antioxidants, antifogging agents, antistatic agents, nucleating agents and flame retardants. In addition, other resins can be incorporated into the resin composition (f) as blending resins, so long as they have no undesirable influence on the present invention.

Among the resin compositions (d), that containing 70 to 30% by weight of the propylene-based block copolymer (a) and 30 to 70% by weight of the amorphous polyolefin (c) is preferred from the viewpoint of the balances between the flexibility and the heat resistance and between the original-shape resuming properties and the heat resistance.

Among the resin compositions (f), that containing 70 to 90% by weight of the above-mentioned resin composition (d) and 30 to 10% by weight of the petroleum resin or hydrogenated product thereof (e) is preferred from the viewpoint of the balance between the cuttability and the impact strength.

The polyethylene type resin (b) used in the present invention includes, for example, low-density polyethylenes, intermediate-density polyethylenes, high-density polyethylenes, copolymers of ethylene and an α-olefin having 3 to 10 carbon atoms (e.g. ethylene-propylene copolymers, ethylene-butene-1 copolymers, ethylene-4-methylpentene-1 copolymers, ethylene-hexene-1 copolymers, ethylene-octene-1 copolymers and ethylene-decene-1 copolymers), and ethylene copolymers obtained from ethylene and an unsaturated compound (e.g. a conjugated diene or a non-conjugated diene) or a comonomer (e.g. acrylic acid, methacrylic acid or vinyl acetate). These polymers can be acid-modified polymers, for example, those obtained by graft modification with an α,β-unsaturated carboxylic acid, an alicyclic carboxylic acid, or a derivative thereof.

The polyethylene type resin (b) is preferably at least one member selected from the group consisting of low-density polyethylenes, copolymers of ethylene and an α-olefin having 3 to 10 carbon atoms (e.g. ethylene-butene-1 copolymers, ethylene-4-methylpentene-1 copolymers, ethylene-hexene-1 copolymers, ethylene-octene-1 copolymers and ethylene-decene-1 copolymers), ethylene-vinyl acetate copolymers, ethylene-acrylic ester copolymers and ethylene-methacrylic ester copolymers.

The polyethylene type resin (b) is particularly preferably a copolymer of ethylene and an α-olefin having 3 to 10 carbon atoms which has the properties (b1) and (b2) described below, or an ethylene-vinyl acetate copolymer containing 70 to 95% by weight of repeating unit derived from ethylene (hereinafter referred to as "ethylene unit") and 30 to 5% by weight of repeating unit derived from vinyl acetate (hereinafter referred to as "vinyl acetate unit"):

(b1) a density of 0.870 to 0.915 g/cm$^3$ and (b2) a maximum peak of fusion at 60° C. or higher and lower than 100° C., as measured with a differential scanning calorimeter (DSC), with the proportion of the heat of fusion at that peak in the total heat of fusion being at least 0.8.

The above-mentioned ethylene-α-olefin copolymer can be obtained, for example, by the process disclosed in JP-A-2-77410. In detail, the ethylene-α-olefin copolymer can be obtained by copolymerizing ethylene and an α-olefin having 3 to 10 carbon atoms in a molar ratio of 35/65 to 60/40 at a polymerization temperature of 40–80° C. to allow a hydrocarbon solvent-insoluble polymer (a slurry portion) and a hydrocarbon solvent-soluble polymer (a solution portion) coexist, by using a catalyst system composed of the following components (a), (b) and (c) so that Al/V (molar ratio) and M/V (molar ratio) may be 2.5 or more and 1.5 or more, respectively: (a) a vanadium compound of the general formula $VO(OR)_nX_{3-n}$ (wherein R is a hydrocarbon group, X is a halogen, and 0<n<3) as a transition metal component, (b) an organoaluminum compound of the general formula $R'_mAlX_{3-n}$ (wherein R' is a hydrocarbon group, X is a halogen atom, and 1<m<3) as organometallic component, and (c) an ester compound (hereinafter referred to as M) of the general formula R"(CO)OR'" (wherein R" is a partially or fully halogen-substituted organic group of 1 to 20 carbon atoms, and R'" is a hydrocarbon group of 1 to 20 carbon atoms) as a third component. The ethylene-α-olefin copolymer can be obtained by carrying out the same polymerization as above by using as the aforesaid transition metal component (a) the vanadium compound obtained by reacting vanadium trichloride with an alcohol which has been disclosed in JP-A-60-226514.

A process for producing the above-mentioned ethylene-vinyl acetate copolymer is not particularly limited, and include known processes such as a process of copolymerizing ethylene with vinyl acetate in the presence of a free-radical initiator.

If necessary, the above-mentioned polyethylene type resin can contain various additives such as antioxidants, antifogging agents, antistatic agents, lubricants, nucleating agents, etc.

The stretch wrapping film can be produced, for example, by a process of forming films by a conventional method such as an blown-film extrusion, a T-die extrusion or the like and then heat-laminating the films, or a process of forming a film with, for example, a blown film-forming machine and a T-die film-forming machine, both being two-kind two-layer or two-kind three-layer co-extrusion type.

In the present invention, when the stretch wrapping film is required to be shrinkable, it is preferable to carry out at least uniaxial stretching after the film formation. Either uniaxial or biaxial stretching can be carried out. The uniaxial stretching is preferably carried out by a conventional roll stretching method. The biaxial stretching can be carried out, for example, by either a successive stretching method comprising monoaxial stretching and then biaxial stretching, or a simultaneous biaxial stretching method such as tubular stretching.

The thus obtained stretch wrapping film is useful for hermetically sealing materials particularly such as foods alone or together with a tray loaded therewith.

The present invention is illustrated with reference to the following examples, which should not be construed as limiting the scope of the invention.

Methods for measuring the physical properties in the examples and comparative examples are as follows.

(1) Percentages of portion (A) and portion (B) (% by weight)

The percentage (PA) of portion (A) and the percentage (PB) of portion (B) were calculated from the material balance in the polymerizations for producing portions (A) and (B), respectively.

(2) Intrinsic viscosity ([η])

Determined in tetralin at 135° C. with an Ubbelohde viscometer.

Intrinsic viscosity values of portions (A) and (B) ([η]A and [η]B)

The intrinsic viscosity [η]B of portion (B) was calculated by the following equation from the intrinsic viscosity [η]A measured after completion of the polymerization for producing portion (A) in the first step, the intrinsic viscosity [η]AB measured after completion of the polymerization in the second step, the percentage (PA) of portion (A) and the percentage (PB) of portion (B):

$$[\eta]B=([\eta]AB-[\eta]A\times PA/100)\times 100/PB$$

(3) Ethylene unit content

Measured by $^{13}$C-NMR according to the method described in "Polymer Analysis Handbook", pp. 615–616, Kinokuniya Shoten, 1995.

Ethylene unit contents (EA and EB) of portions (A) and (B)

The ethylene unit content (EB) of portion (B) was calculated by the following equation from the etylene unit content (EA) measured after completion of the polymerization for producing portion (A) in the first step, the ethylene unit content (EAB) measured after completion of the polymerization in the second step, the percentage (PA) of portion (A) and the percentage (PB) of portion (B):

$$EB=(EAB-EA\times PA/100)\times 100/PB$$

(4) Propylene unit content and butene-1 unit content

Measured by $^{13}$C-NMR according to the method described in "Polymer Analysis Handbook", pp. 615–619, Kinokuniya Shoten, 1995.

(5) Melt flow rate (MFR)

The melt flow rate of a propylene-based block copolymer was measured by the method of condition-14 according to JIS K7210. The melt flow rate of a polyethylene type resin was measured according to the method prescribed in JIS K6760.

(6) Density (d) of ethylene-α-olefin copolymer

Measured after annealing in water at 100° C. for 1 hour, according to the method prescribed in JIS K6760.

(7) Maximum melting peak temperature (Tm)

Using a differential scanning calorimeter (DSC manufactured by Perkin-Elmer Corporation), 10 mg of a sample was previously melted under nitrogen at 220° C. for 5 minutes and then cooled to 40° C. at a cooling rate of 5° C./min. Then, the sample was heated at a rate of 5° C./min. and the peak temperature at the maximum peak of the thus obtained melting endothermic curve was taken as the maximum melting peak temperature (Tm).

The melting point of indium (In) measured at a heating rate of 5° C./min. with the differential scanning calorimeter was 156.6° C.

In the case of an ethylene-α-olefin copolymer, about 10 mg of a test piece cut out of a sheet of about 0.5 mm thickness prepared by hot pressing was placed in the sample pan for measurement of DSC, preheated at 150° C. for 5 minutes, cooled to 40° C. at a rate of 1° C./min., allowed to stand for 5 minutes, and then heated to 150° C. at a rate of 10° C./min. to obtain a thermogram.

The ratio of the heat of melting at the above-mentioned melting peak to the total heat of melting is a value obtained by dividing the area under the endothermic curve at the above-mentioned melting peak by the total endothermic area.

(8) Vinyl acetate unit content

Measured according to JIS K6730.

(9) Heat resistance temperature

According to the Regulation of Tokyo Metropolis No. 1072 "Seal of Quality Tags of Lap Film", a strip-like film sample of 3 cm width and 14 cm length was suspended by holding its portion with a length of 2.5 cm from the upper end with chucks, and a 10 g weight was suspended from the lower place of the sample. A maximum atmosphere temperature at which the film was kept unbroken in the above pending state after the lapse of 1 hour was determined and indicated in the interval of 10° C. The higher this temperature, the higher the heat resistance.

(10) Young's modulus

Measured according to the method prescribed in ASTM D882. The smaller the modulus, the higher the flexibility. The ratio machine direction (MD)/transverse direction (TD) was measured.

Shape of test piece: a 20 mm×120 mm strip

Distance between chucks: 50 mm

Stress rate: 5 mm/min.

(11) Tensile strength and tensile elongation at break

Measured according to the method described in JIS K6781. MD/TD was measured.

(12) Transparency (haze)

Measured according to the method prescribed in ASTM D1003. The smaller the haze value, the higher the transparency.

(13) Cuttability

Turning-in after film cutting in packaging of a tray made of expanded polystyrene with a commercial thrusting-up type tray automatic packaging machine (AW2600AT-III.PE, mfd. by Teraoka Seiki Co.) was judged as follows:

Excellent: a film was not turned in: excellent cuttability.

Good: a film was slightly turned in: good cuttability.

Bad: a film was significantly turned in.

(14) Original-shape resuming properties

A round sample film 1 with a diameter of 44.45 mm was fixed in a film-fixing instrument 2, and a pin 3 having a hemispheric tip with a radius of 6.35 mm was pressed on the center of film with a load cell 4 to be inserted into the instrument 2 to a predetermined depth 5 at a rate of 100 mm/min. Then, the pin 3 was immediately pulled up at the same rate as above, after which whether the mark made by the pressing disappeared completely within 30 seconds or not was observed. A maximum depth 5 of insertion at which the mark made by the pressing disappeared completely was taken as the degree of original-shape resumption.

EXAMPLE 1

[Synthesis of a solid catalyst]

After the inner atmosphere of a 200-liters reactor made of SUS and equipped with a stirrer was replaced with nitrogen, 80 liters of hexane, 6.55 mols of tetrabutoxy titanium, 2.8 mols of diisobutyl phthalate and 98.9 mols of tetraethoxysilane were charged into the reactor to obtain a homogeneous solution. Then, 51 liters of a solution of butylmagnesium chloride in diisobutyl ether having a concentration of 2.1 mols/liter was slowly dropped thereinto over a period of 5 hours while maintaining the temperature in the reactor at 5° C. After completion of the dropping, the resulting mixture was stirred at 20° C. for another 1 hour, separated into solids and a liquid at 20° C. and then washed three times with 70 liters of toluene. Toluene was added thereto to adjust the concentration of the slurry to 0.2 kg/liter, followed by adding thereto 47.6 mols of diisobutyl phthalate, and the reaction was carried out at 95° C. for 30 minutes. After completion of the reaction, the reaction mixture was separated into solids and a liquid and washed twice with toluene. Then, 3.13 mols of isobutyl phthalate, 8.9 mols of butyl ether and 274 mols of titanium tetrachloride were added thereto, and the reaction was carried out at 105° C. for 3 hours. After completion of the reaction, the reaction mixture was separated into solids and a liquid at the same temperature and then washed twice with 90 liters of toluene at the same temperature. Subsequently, the concentration of the slurry was adjusted to 0.4 kg/liter with toluene, after which 8.9 mols of butyl ether and 137 mols of titanium tetrachloride were added to the slurry, and the reaction was carried out at 105° C. for 1 hour. After completion of the reaction, the reaction mixture was separated into solids and a liquid at the same temperature, washed three times with 90 liters of toluene and then three times with 70 liters of hexane at the same temperature, and then dried under reduced pressure to obtain 11.4 kg of a solid catalyst component. The liquid catalyst component contained 1.8% by weight of titanium atoms, 20.1% by weight of magnesium atoms, 8.4% by weight of phthalic ester, 0.3% by weight of ethoxy groups and 0.2% by weight of butoxy groups, and had satisfactory particle properties without containing fine particles.

[Production of a polymer]

<Preactivation of the solid catalyst component>

In an autoclave (internal volume: 3 liters) made of SUS and equipped with a stirrer were placed 1.5 liters of n-hexane, 37.5 mmol of triethylaluminum, 37.5 mmol of t-butyl-n-propyldimethoxysilane and 15 g of the above-mentioned solid catalyst component, which had been thoroughly dehydrated and deaerated. While maintaining the temperature in the autoclave at 30° C. or lower, 15 g of propylene was continuously fed to the autoclave over a period of about 30 minutes to preactivate the solid catalyst component. The resulting solid catalyst slurry was transferred to an autoclave (internal volume: 150 liters) made of SUS and equipped with a stirrer, and was stored together with 100 liters of liquid butane.

<Polymerization>

Two fluidized bed reactors (internal volume: 1 m$^3$) made of SUS and equipped with a stirrer were connected, and the following copolymerizations were carried out in succession: the copolymerization of propylene and ethylene in the first step (the production of portion (A)) was carried out in the first vessel, i.e., one of the reactors, and the copolymerization of propylene and ethylene in the second step (the production of portion (B)) was carried out in the second vessel, i.e., the other reactor.

(1) First vessel (for portion (A))

In the first fluidized bed reactor (internal volume: 1 m$^3$) equipped with a stirrer, propylene was copolymerized with ethylene at an amount of a polymer held in the fluidized bed of 45 kg by continuously feeding the reactor with triethylaluminum at a rate of 75 mmol/h, t-butyl-n-propyldimethoxysilane at a rate of 7.5 mmol/h and the preactivated solid catalyst component at a rate of 0.29 g/h while feeding the reactor with propylene, ethylene and hydrogen so as to maintain the polymerization temperature at 70° C., the polymerization pressure at 18 kg/cm$^2$G, the hydrogen concentration in vapor phase portion at 0.2 vol % and the ethylene concentration in vapor phase portion at 2.4 vol %. Thus, a polymer was obtained at a rate of 9.6 kg/h. The obtained polymer was continuously transferred to the second vessel without being deactivated. A portion of the polymer was sampled and then analyzed to find that the ethylene unit content was 3.7% by weight and the intrinsic viscosity ([η]A) in tetralin at 135° C. 2.80 dl/g.

(2) Second vessel (for portion (B))

In the second fluidized bed reactor (internal volume: 1 m$^3$) equipped with a stirrer, the polymerization of ethylene and propylene was continued in the presence of the catalyst-containing polymer transferred from the first reactor, at an amount of a polymer held in the fluidized bed of 80 kg while feeding the reactor with propylene, ethylene and hydrogen so as to maintain the polymerization temperature at 80° C., the polymerization pressure at 12 kg/cm$^2$G, the hydrogen concentration in vapor phase portion at 0.2 vol % and the ethylene concentration in vapor phase portion at 9.0 vol %. Thus, a white polymer having a high fluidity was obtained at a rate of 18.1 kg/h. The obtained polymer had an ethylene unit content of 8.8% by weight and an intrinsic viscosity ([η]) in tetralin at 135° C. of 2.89 dl/g.

From the above results, the ratio of the polymerization rate in the first vessel to that in the second vessel was found to be 53/47. From the analytical values obtained for portion (A) and the final polymer, the ethylene unit content of portion (B) was calculated to be 14.6% by weight and its intrinsic viscosity ([η]B) in tetralin at 135° C. was calculated to be 3.0 dl/g.

The obtained polymer was pyrolyzed in the presence of a peroxide to adjust MFR to 2.6 g/10 min. Thus, a propylene-based block copolymer was obtained.

The ratio [η]B/[η]A was 1.1.

The content of components with 20° C. xylene soluble, a weight average molecular weight of 26,000 or less, in the obtained propylene-based block copolymer was 1.4% by weight.

[Production of a film]

A stretch wrapping film with a total thickness of 15 μm composed of a surface layer of 5 μm thickness, a core layer of 5 μm thickness and another surface layer of 5 μm thickness was produced by feeding a three-layer film composed of a core layer of the obtained propylene-based block copolymer sandwiched between two surface layers of an ethylene-butene-1 copolymer (Esprene SPO NO372, mfd. by Sumitomo Chemical Co., Ltd.; MFR: 2 g/10 min., d: 0.89 g/cm$^3$, maximum melting peak temperature (Tm): 83° C., the ratio of the heat of melting at the maximum melting peak to the total heat of melting: 1.0) to a three-layer tubular-film processing machine (mfd. by Pulako Co., Ltd.) and processing this film at a die temperature of 200° C. and a blow ratio of 3.0. Table 1 shows characteristic values of the obtained film.

EXAMPLE 2

A stretch wrapping film with a total thickness of 18 μm composed of a surface layer of 6 μm thickness, a core layer of 6 μm thickness and another surface layer of 6 μm thickness was produced in the same manner as in Example 1 except for using a low-density polyethylene (Sumikasene F200-0, mfd. by Sumitomo Chemical Co., Ltd.; MFR: 2 g/10 min., d: 0.923 g/cm$^3$) as surface layers in place of the ethylene-butene-1 copolymer, and feeding such a three-layer film in which the core layer is sandwiched between the surface layers to a three-layer T-die film processing machine (mfd. by Mitsubishi Heavy Industries Ltd.) and processing this film at a die temperature of 240° C. and a chill roll temperature of 30° C. Table 1 shows the results of evaluating the obtained film.

EXAMPLE 3

A stretch wrapping film with a total thickness of 15 μm composed of a surface layer of 5 μm thickness, a core layer of 5 μm thickness and another surface layer of 5 μm thickness was produced in the same manner as in Example 1 except for using an ethylene-vinyl acetate copolymer (Evatate H2081, mfd. by Sumitomo Chemical Co., Ltd.; MFR: 2 g/10 min., ethylene unit content: 85% by weight, vinyl acetate unit content: 15% by weight) as a surface layer in place of the ethylene-butene-1 copolymer. Table 1 shows the results of evaluating the obtained film.

EXAMPLE 4

A stretch wrapping film with a total thickness of 15 μm composed of a surface layer of 5 μm thickness, a core layer of 5 μm thickness and another surface layer of 5 μm thickness was produced in the same manner as in Example 1 except for using an ethylene-vinyl acetate copolymer (Evatate H2081, mfd. by Sumitomo Chemical Co., Ltd.; MFR: 2 g/10 min., ethylene unit content: 85% by weight, vinyl acetate unit content: 15% by weight) as surface layers in place of the ethylene-butene-1 copolymer, and using a resin composition consisting of 50% by weight of the propylene-based block copolymer and 50% by weight of a propylene-butene-1 copolymer (Ubtac UT2780, mfd. by Ube Rekisen Co., Ltd.; propylene unit content: 65% by weight, butene-1 unit content: 35% by weight) as an amorphous polyolefin which had been obtained by melt-kneading in a Banbury mixer, as a core layer in place of the propylene-based block copolymer. Table 1 shows the results of evaluating the obtained film.

EXAMPLE 5

A stretch wrapping film with a total thickness of 15 μm composed of a surface layer of 5 μm thickness, a core layer of 5 μm thickness and another surface layer of 5 μm thickness was produced in the same manner as in Example 1 except for using an ethylene-vinyl acetate copolymer (Evatate H2081, mfd. by Sumitomo Chemical Co., Ltd.; MFR: 2 g/10 min., ethylene unit content: 85% by weight, vinyl acetate unit content: 15% by weight) as surface layers in place of the ethylene-butene-1 copolymer, and using a resin composition prepared by melt-kneading with a single-screw extruder a mixture consisting of 80% by weight of a resin composition composed of 50% by weight of the propylene-based block copolymer and 50% by weight of a propylene-butene-1 copolymer (Ubetac UT2780, mfd. by Ube Rekisen Co., Ltd.; propylene unit content: 65% by weight, butene-1 unit content: 35% by weight) as an amorphous polyolefin and 20% by weight of a petroleum resin (Arkon P125, mfd. by Arakawa Chemical Co., Ltd.), as a core layer in place of the propylene-based block copolymer. Table 2 shows the results of evaluating the obtained film.

COMPARATIVE EXAMPLE 1

A stretch wrapping film with a total thickness of 15 μm composed of a surface layer of 5 μm thickness, a core layer of 5 μm thickness and another surface layer of 5 μm thickness was produced in the same manner as in Example 1 except for using a propylene-ethylene random copolymer (Noblene RH120B, mfd. by Sumitomo Chemical Co., Ltd.; MFR: 2.6 g/10 min., propylene unit content: 97.5% by weight, ethylene unit content: 2.5% by weight) in place of the propylene-based block copolymer. Table 2 shows the results of evaluating the obtained film. This film was inferior to the film of Example 1 in flexibility and original-shape resuming properties.

COMPARATIVE EXAMPLE 2

A stretch wrapping film with a total thickness of 15 μm composed of a surface layer of 5 μm thickness, a core layer of 5 μm thickness and another surface layer of 5 μm thickness was produced in the same manner as in Example 1 except for using an ethylene-hexene-1 copolymer (Sumikasene α FZ 201-0, mfd. by Sumitomo Chemical Co., Ltd.; MFR: 2 g/10 min., density: 0.912 g/cm³) as a core layer in place of the propylene-based block copolymer, and an ethylene-vinyl acetate copolymer (Evatate H2081, mfd. by Sumitomo Chemical Co., Ltd.; MFR: 2 g/10 min., ethylene unit content: 85% by weight, vinyl acetate unit content: 15% by weight) as surface layers in place of the ethylene-butene-1 copolymer, and feeding such a three-layer film in which the core layer is sandwiched between the surface layers to a three-layer tubular-film processing machine (mfd. by Pulako Co., Ltd.) and processing this film at a die temperature of 170° C. and a blow ratio of 3.0. Table 2 shows the results of evaluating the obtained film. This film was inferior to the film of Example 1 in heat resistance and cuttability.

TABLE 1

| Item | Example 1 | Example 2 | Example 3 | Example 4 |
|---|---|---|---|---|
| Heat resistance (° C.) | 150 | 150 | 150 | 150 |
| Young's modulus MD (kg/cm²) | 2000 | 2200 | 2100 | 560 |
| Young's modulus TD (kg/cm²) | 1900 | 2200 | 1800 | 600 |
| Tensile strength at break MD (kg/cm²) | 570 | 540 | 600 | 340 |
| Tensile strength at break TD (kg/cm²) | 550 | 320 | 510 | 320 |
| Tensile elongation at break MD (%) | 780 | 830 | 810 | 360 |
| Tensile elongation at break TD (%) | 880 | 930 | 930 | 550 |
| Haze (%) | 1.0 | 1.1 | 1.2 | 1.4 |
| Cuttability | Good | Good | Good | Good |
| Original-shape resuming properties (mm) | 10 | 7 | 10 | 13 |

TABLE 2

| Item | Example 5 | Comparative Example 1 | Comparative Example 2 |
|---|---|---|---|
| Heat resistance (° C.) | 150 | 150 | 120 |
| Young's modulus MD (kg/cm²) | 540 | 4300 | 1400 |
| Young's modulus TD (kg/cm²) | 570 | 4100 | 1300 |
| Tensile strength at break MD (kg/cm²) | 340 | 590 | 320 |
| Tensile strength at break TD (kg/cm²) | 340 | 560 | 330 |
| Tensile elongation at break MD (%) | 370 | 800 | 350 |
| Tensile elongation at break TD (%) | 570 | 860 | 680 |
| Haze (%) | 1.3 | 1.0 | 1.3 |
| Cuttability | Excellent | Good | Bad |
| Original-shape resuming properties (mm) | 14 | 5 | 7 |

As described above in detail, according to the present invention, there can be provided a stretch wrapping film excellent in heat resistance, flexibility, mechanical strength, transparency, cuttability and original-shape resuming properties.

Furthermore, the present invention can provide a stretch wrapping film excellent also in view of safety and sanitation without generating any carcinogenic substances upon incineration.

What is claimed is:

1. A stretch wrapping film comprising:
   a first layer comprising a propylene-based block copolymer (a) obtainable by a polymerization process comprising a first step of forming portion (A) which is a propylene-ethylene copolymer having a content of repeating unit derived from ethylene of 1.5 to 6% by weight, said portion (A) forming 40 to 85% by weight of said propylene-based block copolymer, and a second step of forming of portion (B) which is a propylene-ethylene copolymer having a content of repeating unit derived from ethylene of 7 to 17% by weight, said portion (B) forming 15 to 60% by weight of said propylene-based block copolymer, the intrinsic viscosity of portion (B), ([η]B), being 2 to 5 dl/g, and the ratio ([η]B/[η]A) of the intrinsic viscosity of portion (B) ([η]B), to the intrinsic viscosity of portion (A) ([η]A), being 0.5 to 1.8, and
   a second layer comprising a polyethylene based resin (b) laminated on at least one surface of the first layer wherein said stretch wrapping film is unoriented or uniaxially oriented and said polyethylene based resin is at least one resin selected from the group consisting of low-density polyethylenes, intermediate-density polyethylenes, high-density polyethylenes, copolymers of ethylene and an α-olefin having 3 to 10 carbon atoms ethylene copolymers obtained from ethylene and an unsaturated compound ethylene-vinyl acetate copolymers, ethylene-acrylic acid copolymers, and ethylene-methacrylic acid copolymers.

2. The film of claim 1, wherein the first layer comprises a resin composition (d) containing 80 to 20% by weight of the propylene-based block copolymer (a) and 20 to 80% by weight of an amorphous polyolefin (c).

3. The film of claim 1, wherein the first layer comprises a resin composition (f) containing 60 to 95% by weight of a resin composition (d) containing 80 to 20% by weight of the propylene-based block copolymer (a) and 20 to 80% by weight of an amorphous polyolefin (c), and 40 to 5% by weight of a petroleum resin and/or a hydrogenated product thereof (e).

4. The film of claim 1, wherein the polyethylene based resin (b) is at least one polyethylene based resin selected from the group consisting of low-density polyethylenes, copolymers of ethylene and an α-olefin having 3 to 10 carbon atoms, ethylene-vinyl acetate copolymers, ethylene-acrylic ester copolymers and ethylene-methacrylic ester copolymers.

5. The film of claim 1, wherein the polyethylene based resin (b) is a copolymer of ethylene and an α-olefin having 3 to 10 carbon atoms which has the following properties (b1) and (b2):

(b1) a density of 0.870 to 0.915 g/cm³, and
   (b2) a maximum peak of fusion at 60° C. or higher and lower than 100° C. as measured with a differential scanning calorimeter (DSC), with the proportion of the heat of fusion at the maximum peak to in the total heat of fusion being at least 0.8.

6. The film of claim 1, wherein the polyethylene based resin (b) is an ethylene-vinyl acetate copolymer containing 70 to 95% by weight of repeating unit derived from ethylene and 30 to 5% by weight of repeating unit derived from vinyl acetate.

7. The packaging stretched film of claim 1, wherein the propylene-based block copolymer (a) is a copolymer obtainable by the polymerization process conducted in the presence of a Ziegler-Natta catalyst.

8. A method for sealing materials hermetically, which comprises wrapping the materials with the stretch wrapping film of claim 1.

9. Materials wrapped with the stretch wrapping film of claim 1.

* * * * *